PATENT OFFICE
3,193,123
Patented July 6, 1965

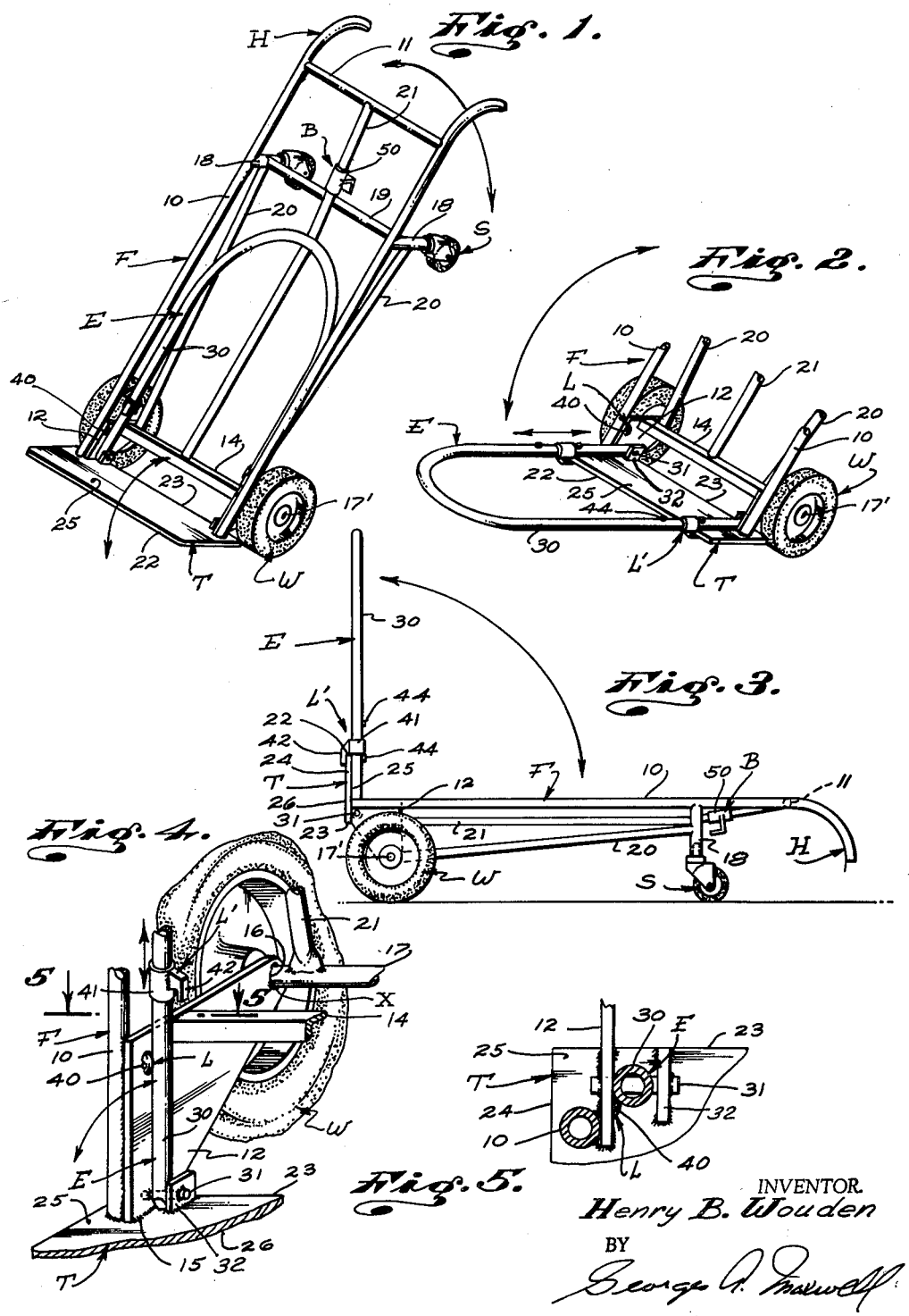

3,193,123
UTILITY TRUCK
Henry B. Wouden, 429 Pomelo Drive,
Monterey Park, Calif.
Filed Jan. 15, 1964, Ser. No. 337,928
7 Claims. (Cl. 214—383)

This invention relates to a utility truck and is more particularly concerned with a novel, manually operated, adjustable and/or convertible utility truck construction.

Throughout industry, where materials and/or goods are handled, wheeled transporting devices are employed. In situations where the materials or goods being handled can be manipulated by manual labor, small manually operated wheeled trucks are employed.

As the art of transporting goods has developed, two basic types of manually operated wheeled trucks have evolved.

The first and most common type of wheeled truck consists of an elongate, normally upwardly and rearwardly projecting material supporting frame with handles at its upper end, a forwardly projecting material engaging and supporting toe plate at its lower end and a pair of laterally spaced support wheels mounted at the lower end of the frame to occur rearwardly thereof. This type of truck has become commonly known as a "hand truck."

Hand trucks, such as described above are made in many different and special designs for special uses. For example, especially designed hand trucks with short toe plates, are provided for handling goods in small packages or containers. Such especially designed trucks are not suitable for handling large cartons or sacked goods, such as coal or potatoes. Accordingly, especially designed hand trucks with larger or longer toe plates are provided for handling large cartons and sacked gods.

In addition to the above example, especially designed hand trucks are provided for handling barrels or drums, soft drink cases, appliances and many other goods and materials which present special handling problems.

As a result of the above, a great number of shops, warehouses, stores and common carriers, must purchase, maintain and use a wide variety of hand trucks. The necessity and/or desirability of having several available types or styles of hand trucks is expensive, complicated and troublesome.

The other or second type of wheeled truck that the art has developed and which finds wide use throughout industry includes an elongate horizontally disposed frame with an upwardly projecting handle at one end, a pair of support wheels, on fixed axles, at one end of the frame and a pair of caster type wheels at the other end of the frame. This four wheeled type of truck is commonly referred to as a flat bed truck and is widely used to carry or transport goods which are too bulky or of such size and shape that they cannot be advantageously transported on a two wheeled "hand truck."

The latter, second type of truck is widely used in shops, warehouses and stores but is infrequently used by truckers or common carriers, in spite of the frequent need for such a truck. This is due to the fact that such trucks are awkward and difficult to handle, as for instance, they are difficult to load and unload from trucks and the like. Further, such trucks occupy considerable space. Still further, there is a practical limit as to the number of special pieces of work handling equipment a trucker or the like can be equipped with.

An object of my invention is to provide a manually operated, wheeled material handling truck which is convertible from a two wheeled "hand truck" to a four wheeled "platform truck."

Another object of the present invention is to provide a utility truck of the character referred to having an elongate frame with a toe plate and a pair of primary support wheels at one end and handles at its other end whereby said construction is serviceable as a two wheeled hand truck.

A further object of my invention is to provide a truck of the general character referred to having an elongate combination handle and toe plate extension pivotally carried by the frame and shiftable from a position where it extends parallel with the frame to a position where it projects at right angles to the frame in the direction in which the toe plate projects from the frame.

Another object of this invention is to provide a truck of the character referred to having a pair of secondary, caster type, support wheels at the end portion of the frame remote from the primary support wheels, which secondary support wheels cooperate with the primary wheels and serve to support the frame in a horizontal position when it is employed as a two wheeled hand truck and is in a down or horizontal position and which serve as supporting and turning wheels when the truck is used as a platform truck.

It is a further object of my invention to provide a truck of the character referred to wherein the combination handle and toe plate extension is in the nature of a U-shaped tubular part that projects upwardly from one end of the frame when the frame is in a horizontal position for use as a platform truck and provides a suitable handle and work or load support.

Still another object of my invention is to provide novel locking means to releasably and rigidly hold the combination handle and toe plate extension in its extended or working position and so that it will not swing or give way when engaged by forces which might otherwise shift it to its down or retracted position.

Another object of the present invention is to provide a truck of the character referred to having a novel hook means for releasably engaging the upper rim portions of barrels, drums, boxes and other like large and difficult to handle items, to facilitate handling such items.

A further object of this invention is to provide a utility truck of the character referred to having a novel, rigid, durable and compact frame construction; a truck which is easy and economical to manufacture and a truck which is highly effective, dependable and easy to operate.

The various objects and features of my invention will be fully understood from the following detailed description of a typical preferred form and application of my invention, throughout which description reference is made to the accompanying drawings, in which:

FIGURE 1 is an isometric view of my utility truck construction showing it in position for use as a two wheeled hand truck;

FIGURE 2 is a view of a portion of the construction shown in FIGURE 1 and showing certain parts in different positions;

FIGURE 3 is a side elevational view of my new truck, showing it in position for use as a four wheeled platform truck;

FIGURE 4 is an enlarged isometric view of a portion of the new hand truck that I provide; and FIGURE 5 is a sectional view taken as indicated by line 5—5 on FIG. 4.

The truck provided by this invention and illustrated in the accompanying drawings includes generally an elongate frame F, handles H at one end of the frame, a toe plate T at the other end of the frame, a pair of primary support wheels W at said other end of the frame, a combination toe plate extension and retractable handle E at said other end of the frame and related to the toe plate, and a pair of secondary support wheels S carried by the frame at or near said one end thereof.

The truck is further provided with a barrel hook B shiftably carried by the frame at said one end portion thereof and adapted to engage and facilitate handling barrels, drums, plates and other like, large and cumbersome objects.

The frame F is an elongate structure fabricated of steel tubing, plate and angle stock. The various related parts going to make up the frame are secured or fixed together by welding to establish a unitary, integrated frame structure.

In the form of the invention illustrated, the frame F is provided with a pair of laterally spaced, elongate, parallel side members or rails 10, coextensive with the longitudinal extent of the frame, a tie bar 11 fixed to and extending between the rails at one end thereof and transverse the longitudinal axis of the frame, a pair of laterally spaced axle brackets 12, formed of steel plate, fixed to the other ends of the rail and an elongate angle iron spreader 14 fixed to and extending between the brackets.

That portion of the frame F set forth above, that is, the primary portion of the frame, defines an elongate, flat, rectangular frame work having ends, sides and oppositely disposed planes or surfaces. When the portion of the frame now under consideration is vertically disposed and used as a hand truck, it has upper and lower ends, parallel sides and front and rear planes or surfaces. When it is horizontally disposed and used as a hand truck or a platform truck, the front and rear planes or surfaces become upper and lower planes or surfaces and the upper and lower ends become front and rear ends.

In accordance with the above and in order to prevent confusion in the following, the construction will be described with the frame in its horizontal position. The end of the frame with which the toe plate T and primary wheels W are related will be referred to as the base end of the frame and of the construction. The other end of the frame or construction will be referred to as the head end. The top and/or front plane or surface will be referred to as the top of the frame and the rear and/or bottom plane or surface will be referred to as the back or bottom of the frame.

The axle brackets 12 are simple flat steel plates of limited longitudinal extent. The brackets 12 are welded to the inner sides of the end portions of the rails 10 to which they are related, to project downwardly from the back of the frame. The planes in which said brackets are arranged are at right angles to the back or bottom plane of the frame and are parallel with the longitudinal axis of the frame.

The brackets 12 have straight base ends or edges 15 of limited longitudinal extent, extending on a plane normal to the longitudinal axis of the frame and coincidental with the base end of the rails 10.

The brackets 12 are further provided with axially aligned axle receiving openings 16 spaced a predetermined distance below and longitudinally towards the head end of the frame, from the base end thereof.

An elongate axle member 17 is engaged through the opening 16 in the brackets to extend therebetween and is fixed therein by welding X. The axle member 17 has end portions 17' that project laterally outwardly from the brackets and on which the wheels W are mounted.

From the foregoing, it will be apparent that the axle member 17 is, in effect, an integral part of the frame F.

The spreader 14 is a simple straight length of angle iron and is arranged to extend between the brackets 12, to which it is fixed by welding, at points spaced below the rails 10 and above the axle 17. The spreader 14 is arranged or positioned so that the frame will freely accommodate the extension E, as will hereinafter be described.

In addition to the foregoing, the frame F is provided with a pair of laterally spaced downwardly extending and downwardly opening columns 18 at the head and portion thereof. The columns 18 are fixed to the lower sides of the rails 10 with which they are related by welding and are adapted to cooperatively engage and mount the secondary wheels S, as will hereinafter be described.

The frame F further includes a spreader 19 fixed to and extending between the columns 18 and pair of elongate laterally spaced stringers 20 fixed to and extending between the columns and the axle 17.

The spreader 19 and stringers 20 support the columns and cooperate with the other members and/or parts of the frame to establish an extremely rigid and strong, open box-like frame.

An elongate central or intermediate stringer 21 is provided to extend from the center of the bar 11 to the spreader 19 and thence to the spreader 14. The central stringer 21 serves to carry the barrel hook B, serves as a stop for the extension E as will hereinafter be described, and serves to support work engaged on the frame and to prevent such work from falling through the frame.

The handles H at the head end of the frame are simple axially outwardly and downwardly turned extensions on the ends of the rails 10.

The toe plate T is a flat rectangular steel plate having straight parallel, elongate, upper and lower edges 22 and 23 and parallel side edges 24. The plate T has a flat work supporting surface 25 disposed towards the head end of the frame and opposing the base end thereof and has an oppositely disposed ground-engaging surface 26.

The toe plate T is arranged adjacent the base end of the frame in a vertical plane and is in butted engagement on the base ends of the rails 10 and the base edges 15 of the brackets, as clearly illustrated in the drawings.

The edges 15 of the brackets 12 extend transverse the plate through about the lower one-quarter thereof and are fixed thereto by welding. The adjacent ends of the rails 10 are also fixed to the plate by welding. The remainder of the plate or about three-quarters of the plate projects upwardly from the top plane or surface of the frame.

With the relationship of parts set forth above it will be apparent that the plate is well secured to the frame and that the brackets 12 afford great support and rigidity to the plate.

The primary support wheels W are conventional or standard wheel constructions commonly employed in utility trucks and are rotatably supported on the ends 17' of the axle 17, in accordance with normal practice.

The relationship of the location of the axle 17 and the diameter of the wheels W is such that the wheels occurs below the rails 10 of the frame F and their outer peripheral limits are tangential with the plane of the toe plate T.

It is to be noted that by arranging the brackets 12 adjacent the inner sides of the rails 10, the wheels W can be set closer together, so that they occur below the rails 10 of the frame, they provide a narrower or more compact construction and a construction wherein the frame overlies and prevents work engaged on the frame from interfering with the wheels.

With the structure thus far described, it will be apparent that I have provided a substantially conventional two wheeled hand truck.

Since the manner in which such hand trucks are operated is well known to those familiar with the art, I will not burden this specification with an explanation of the manner in which my construction can be operated or used as a two wheeled hand truck.

The extension E that I provide is shown as including an elongate U-shaped tubular part. The free ends of the leg portions 30 of the extension E occur adjacent the inner surfaces of the brackets 12 and are pivotally mounted thereto by means of pivot pins 31. The pins 31 are engaged through openings in the brackets to project laterally inwardly therefrom. In the case illustrated, the pins project from the plate 12, through openings in the legs 30 and thence through openings in support plates 32 welded to and projecting from the supporting surface 25 of the toe plate, laterally inwardly of the extension legs. The end portions of the pins 31 are fixed to the brackets and the plates by welding.

The space between the brackets and the plate 32 is slightly greater than the diametric extent of the extension legs 30 so that the legs can be shifted a short distance laterally on the pivot pins 31.

The extension E is initially formed so that the legs 30 are slightly divergent so that they must be sprung laterally inwardly to be engaged between the brackets and so that they establish yielding pressure engagement on the brackets.

The pivot pins 31 are arranged in close proximity to the toe plate and are spaced below the rails 10 so that when the extension is in its retracted, down or horizontal position, as shown in FIGURES 1, 4 and 5 of the drawings, it occurs below the top of the frame and will not interfere with work supported thereon and so that when it is pivoted to its up or extended position, as shown in FIGURES 2 and 3 of the drawings, the end portions of the legs 30 establish flat bearing engagement on the surface 25 of the toe plate T and are supported thereby.

When the extension is in its up or working position, it projects a substantial distance beyond the upper edge 22 of the toe plate and provides a greater and/or deeper effective work-engaging and supporting area at the base end of the construction than is provided by the toe plate T.

The extension is particularly adapted for use when the construction is used as a two wheeled hand truck for handling long cartons, such as the cartons in which toilet tissue is shipped and for handling sacked goods, such as potatoes and the like.

When the extension is in its down or retracted position, the base portion of the extension engages and is stopped by the central stringer 21 and the angle iron spreader 14, as clearly illustrated in the drawings.

Suitable locking means L and L' are provided to releasably hold the extension in its two positions. The lock means L provided to hold the extension in its down position involves a button-like enlargement 40 on the inner surface of each bracket 12. The enlargements 40 occur above the extension legs related thereto, when the extension is in its down position. When the extension is shifted to its up position, the legs must be urged and sprung over the enlargements 40.

It will be apparent that the enlargements 40 effectively, yieldingly maintain the extension in its down position.

The lock means L' provided to hold the extension in its up or working position includes a sleeve 42 slidably engaged on each leg of the extension and a laterally outwardly and axially downwardly extending hook 43 on the sleeve. When the extension is shifted to its up position, the sleeves 42 are urged downwardly on the legs so that the hooks 43 thereon establish hooked engagement over the uper edge of the toe plate T, as clearly illustrated in FIGURES 2 and 3 of the drawings.

The hooks 43 are released by simply shifting the sleeves upwardly.

Suitable stop pins 44 are provided on the legs of the extension to prevent the sleeves from shifting an excessive distance on the legs and in such a manner as might interfere with or make operation of the construction less convenient.

It will be apparent that when the extension E is locked in its up or working position, it is held firmly and rigidly in said position and is serviceable as a handle for moving and manipulating the truck.

The secondary support wheels S are simple, conventional caster type wheels arranged below the columns 18 and mounted with or in the columns by means of suitable upwardly projecting mounting pins (not shown) engaged in the columns 18 from the lower open ends thereof.

The caster wheels S are of such size that when the construction is in its horizontal position, the wheels S engage the deck or ground and support the head end portion of the frame above the ground.

When the construction is in its down or horizontal position as set forth above, the construction is in the nature of a four wheeled, platform truck. When it is thus arranged and the extension E is locked in its up position, as shown in FIGURE 3 of the drawings, the base portion of the extension E occurs in spaced relationship above the base end of the construction and serves as a handle for manipulating and guiding the truck across a supporting surface. The handles H at the head end of the truck are clear of the supporting surface or ground and serve as bumpers for the head end of the truck.

It will be apparent that the wheels S, being caster wheels, allow for great manuverability of the truck when it is in its horizontal position. It will be further apparent that the wheels S being relatively small, present no weight problem and are so positioned that they afford no more obstruction, when the construction is employed as a two-wheeled hand truck, than do the common support legs provided on conventional hand truck constructions.

The barrel hook B that I provide includes a sleeve 50 slidably engaged on that portion of the central stringer extending between the spreaders 11 and 19. The sleeve 50 has a laterally and axially extending hook at one side, as clearly illustrated in FIGURES 1 and 3 of the drawings.

When the truck is used as a two wheeled hand truck and is employed to move a barrel or the like, the sleeve 50 is rotated and shifted axially on the stringer 21 so that the hook 51 establishes hooked engagement on or over the rim of the barrel. When the hook is thus engaged with the barrel, the upper end of the barrel is held in close proximity to the frame and the difficulty of subsequent tipping and manipulation of the barrel and the truck is materially reduced.

From the foregoing, it will be apparent that I have provided a novel, highly versatile, effective and dependable utility truck construction which is serviceable for moving and handling many different types and/or kinds of materials and goods and for which the prior art provides separate and distinct utility truck constructions.

Having described only a typical preferred form and application of my invention, I do not wish to be limited to the specific details herein set forth but wish to reserve to myself any modifications and variations that may appear to those skilled in the art and which fall within the scope of the following claims:

Having described my invention, I claim:

1. A truck of the character referred to including, an elongate, open, tubular frame with laterally spaced longitudinally extending side rails and longitudinally spaced laterally extending spreaders, said frame refining head and base ends and upper and lower planes, a pair of laterally spaced axle brackets fixed to and depending from the side rails at the base end portion of the frame, an axle fixed to and extending between the brackets and rotatably supporting a pair of support wheels, an elongate toe plate fixed to the base end of the rails and the brackets to extend transverse of the base end of the frame and to project upwardly therefrom, an elongate U-shaped extension having a pair of elongate parallel leg portions and a curved base portion, means pivotally mounting the free ends of the leg portions to the brackets below the rails and adjacent the toe plate, said extension being shiftable from a horizontal down position where it occurs between and below the side rails to a vertical up position where it occurs adjacent the toe plate and projects upwardly therefrom, and longitudinally outwardly and downwardly extending handles at the head end of the frame.

2. A structure as set forth in claim 1 including, locking means to releasably hold the extension in its up position including, a sleeve slideably engaged on each leg portion of the extension and a downwardly opening hook on each sleeve to engage the upper edge of the toe plate.

3. A structure as set forth in claim 1, wherein said means pivotally connecting the ends of the legs of the extension to the brackets includes, laterally inwardly projecting pivot pins on the bracket and slideably and rotatably engaged through openings in the legs, said construction further including means releasably retaining the extension in its down position and including a cam enlargement on the inner surface of each plate to occur above the central plane of the extension and to engage the adjacent legs of the extension when said extension is in its down position.

4. A structure as set forth in claim 1 wherein said means pivotally connecting the ends of the leg portions of the extension to the brackets includes, laterally inwardly projecting pivot pins on the brackets and slideably and rotatably engaged through openings in the legs, said construction further including a first and a second locking means to releasably hold the extension in its down and in its up position, said first locking means including a cam enlargement on the inner surface of each plate to occur on a plane above the central plane of the extension and engaging the legs of the extension when it is in its down position, said second locking means including a sleeve slideably engaged on each leg portion of the extension, a laterally projecting hook on each sleeve and opening downwardly when the extension is in its up position, said hooks adapted to be shifted into hooked engagement with the upper edge of the toe plate.

5. A truck as set forth in claim 1 wherein said frame has a central longitudinal stringer extending below and supporting the extension when the extension is in its down position, a sleeve slideably engaged on the central stringer at the head end portion of the frame and a hook on the sleeve projecting laterally outwardly and thence longitudinally towards the base end of the construction and adapted to engage the rim of a barrel engaged on the toe plate and arranged adjacent the frame.

6. A truck of the character referred to including, an elongate frame having a base end, a head end, parallel side and upper and lower planes, a pair of laterally spaced longitudinally outwardly and downwardly projecting bumper and hand-engaged extensions at the head end of the frame, a flat rectangular toe plate at the base end of the frame extending transversely thereof and projecting upwardly therefrom, a pair of laterally spaced support wheels rotatably carried by the frame below the base end portion thereof, a pair of laterally spaced caster wheels rotatably carried by the head portion of the frame, an elongate work and hand engaging extension with one end pivotally secured to the base portion of the frame and shiftable from a horizontal down position where it extends parallel with the frame to a vertical up position where it extends parallel with and upwardly from the toe plate, and locking means for releasably holding said extension in its up position and including vertically shiftable parts on the extension and downwardly disposed hooks on said parts engageable over the upper edge of the toe plate.

7. A truck of the character referred to including, an elongate frame having a base end, a head end, parallel sides and upper and lower planes, a pair of laterally spaced longitudinally outwardly and downwardly projecting bumper and hand-engaging extensions at the head end of the frame, a flat rectangular toe plate at the base end of the frame extending transversely thereof and projecting upwardly therefrom, a pair of laterally spaced support wheels rotatably carried by the frame below the base end portion thereof, a pair of laterally spaced support wheels rotatably carried by the head portion of the frame and in elongate work and hand engaging extension with one end pivotally secured to the base portion of the frame and shiftable from a horizontal down position where it extends parallel with the frame to a vertical up position where it extends parallel with and upwardly from the toe plate, said extension including an elongate U-shaped tubular part occurring within the confines of the side of the frame when it is in its down position and has a curved hand engaging base portion extending transverse the axis of the frame and elongate leg portions occurring adjacent and parallel with the inner sides of the frame and having their free ends pivotally connected with the frame, and locking means for releasably securing the extension in its up, vertical position including a sleeve slideably engaged on each leg and a downwardly opening hook on each sleeve to engage the upper edge of the toe plate.

References Cited by the Examiner

UNITED STATES PATENTS

| | | | |
|---|---|---|---|
| 641,286 | 1/00 | Gilfillan | 214—383 |
| 1,024,469 | 4/12 | Ballinger | 280—47.29 X |
| 2,519,113 | 8/50 | Cohn | 280—47.29 X |
| 2,725,153 | 11/55 | Rachman et al. | 280—47.29 X |
| 3,079,168 | 2/63 | Monroe et al. | 280—47.27 X |
| 3,102,648 | 9/63 | Hughes | 214—375 |
| 3,104,890 | 9/63 | Hill | 280—47.18 X |

GERALD M. FORLENZA, *Primary Examiner.*